(12) United States Patent
Fujino et al.

(10) Patent No.: US 6,755,662 B2
(45) Date of Patent: Jun. 29, 2004

(54) METHOD FOR PRESENTING MOST SUITABLE QUESTION AND APPARATUS FOR PRESENTING MOST SUITABLE QUESTION

(75) Inventors: Akio Fujino, Ota (JP); Hiroshi Kuzumaki, Ota (JP); Shunichi Kamikawa, Kawasaki (JP); Norio Takeda, Ota (JP); Hitoshi Ozawa, Ota (JP)

(73) Assignee: Fujitsu Limited, Kawasaki (JP)

( * ) Notice: Subject to any disclaimer, the term of this patent is extended or adjusted under 35 U.S.C. 154(b) by 90 days.

(21) Appl. No.: 10/288,497

(22) Filed: Nov. 6, 2002

(65) Prior Publication Data

US 2003/0186206 A1 Oct. 2, 2003

(30) Foreign Application Priority Data

Mar. 27, 2002 (JP) ........................................ 2002-089405
Jun. 26, 2002 (JP) ........................................ 2002-186681

(51) Int. Cl.$^7$ ................................................. G09B 7/00
(52) U.S. Cl. ........................ 434/322; 434/323; 434/362
(58) Field of Search ................................ 434/322, 323, 434/350, 362

(56) References Cited

U.S. PATENT DOCUMENTS 5,823,781 A * 10/1998 Hitchcock et al. .......... 434/118
5,987,302 A * 11/1999 Driscoll et al. ............. 434/353
6,171,112 B1 * 1/2001 Clark et al. ................. 434/322
6,193,518 B1 * 2/2001 Nocera ....................... 434/236
6,347,333 B2 * 2/2002 Eisendrath et al. ......... 709/217
6,358,053 B1 * 3/2002 Rosenfield et al. ......... 434/156
6,482,012 B1 * 11/2002 Nocera et al. .............. 434/236
2001/0039002 A1 * 11/2001 Delehanty ................... 434/322
2002/0098468 A1 * 7/2002 Barrett et al. ............... 434/322
2002/0119434 A1 * 8/2002 Beams et al. ............... 434/322
2002/0142278 A1 * 10/2002 Whitehurst et al. ........ 434/350
2002/0187462 A1 * 12/2002 Mariappan .................. 434/350
2002/0187463 A1 * 12/2002 Aspe et al. ................. 434/362
2003/0152904 A1 * 8/2003 Doty, Jr. .................... 434/350
2004/0002046 A1 * 1/2004 Cantor ....................... 434/322

* cited by examiner

Primary Examiner—John Edmund Rovnak
(74) Attorney, Agent, or Firm—Staas & Halsey LLP

(57) ABSTRACT

In a method for presenting questions by a host computer receiving questions from users, a question most suitable to an user can be presented. In an education system wherein plurality of students' personal computers PC are connected to an education center through a network, at the time of the FAQ search from a student, a plurality of FAQ questions are presented in the order appropriate to the student, by matching the FAQ level and FAQ keywords to the student's level and the keywords learned by the student. The student can easily select a question compatible with his/her own question, from the presented questions.

5 Claims, 21 Drawing Sheets

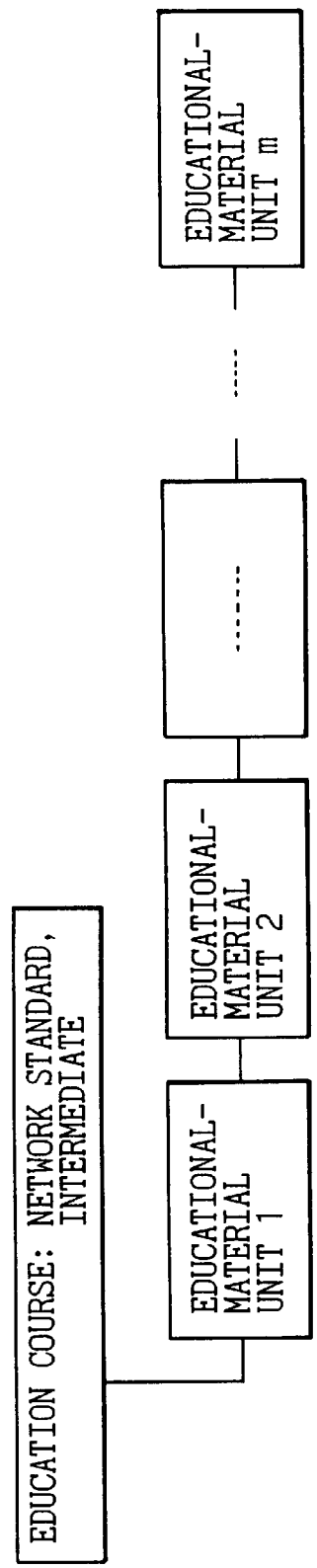

Fig.4

EDUCATIONAL-MATERIAL DB 31

| CATEGORY | EDUCATION SERIES | EDUCATION COURSE | EDUCATIONAL-MATERIAL UNIT NUMBER | LEVEL | LEARNING KEYWORD | PRECONDITION KEYWORD | EDUCATIONAL-MATERIAL ENTITY (CONTENTS OF EDUCATIONAL MATERIALS) |
|---|---|---|---|---|---|---|---|
| NETWORK | NETWORK STANDARD | NETWORK STANDARD, INTERMEDIATE I | 276 | 2 | MAC ADDRESS VENDOR CODE IEEE NIC | ADDRESSING NETWORK ADDRESS HOST ADDRESS IP ADDRESS TCP/IP ADDRESS | MAC ADDRESS IS SET IN NIC CONNECTING TO EACH COMPUTER. THIS PART IS AN ADDRESS SPECIFIED FOR A MANUFACTURER FOR SETTING NIC. IEEE IS... |
| ⋮ | ⋮ | ⋮ | ⋮ | ⋮ | ⋮ | ⋮ | ⋮ |

Fig.5

FAQ-DB 32

| FAQ NUMBER | CATEGORY | ACCUMULATION OF FAQ EFFECTIVE NUMBER FOR EACH STUDENT LEVEL | | | | | QUESTION KEYWORD | ANSWER KEYWORD | QUESTION | ANSWER |
|---|---|---|---|---|---|---|---|---|---|---|
| | | 1 | 2 | 3 | 4 | 5 | | | | |
| 125 | NETWORK | 30 | 98 | 32 | 21 | 3 | NETWORK ADDRESS HOST ADDRESS TCP/IP | TCP/IP IP ADDRESS LAYER 3 NETWORK LAYER OSI REFERENCE MODEL | WHAT ARE THE HOST ADDRESS OF TCP/IP AND THE NETWORK ADDRESS? | THE HOST ADDRESS IS DESCRIBED AT THE DESCENDENT OF THE IP ADDRESS IN TCP/IP... |
| ⋮ | ⋮ | · | · | · | · | · | ⋮ | ⋮ | ⋮ | ⋮ |

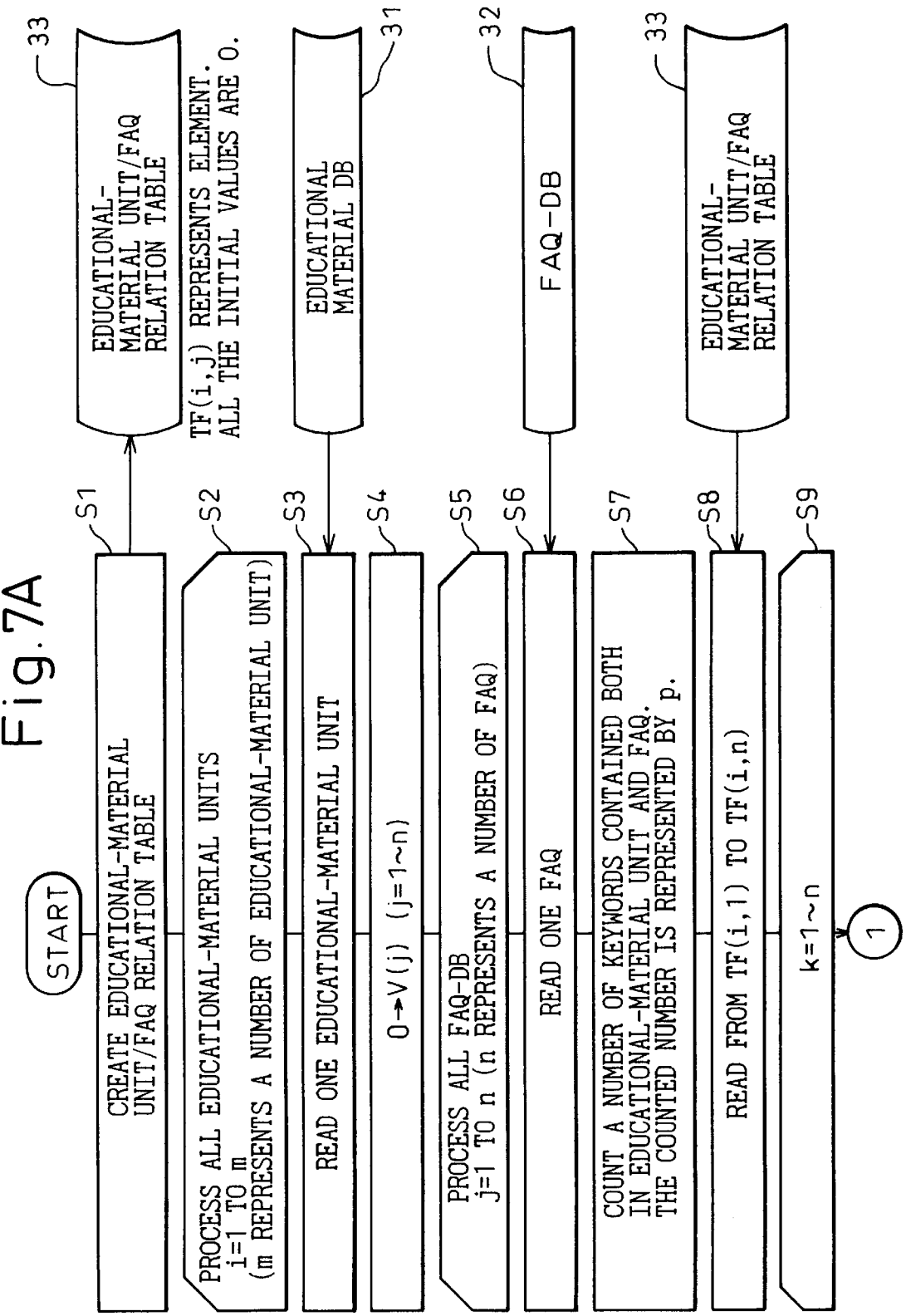

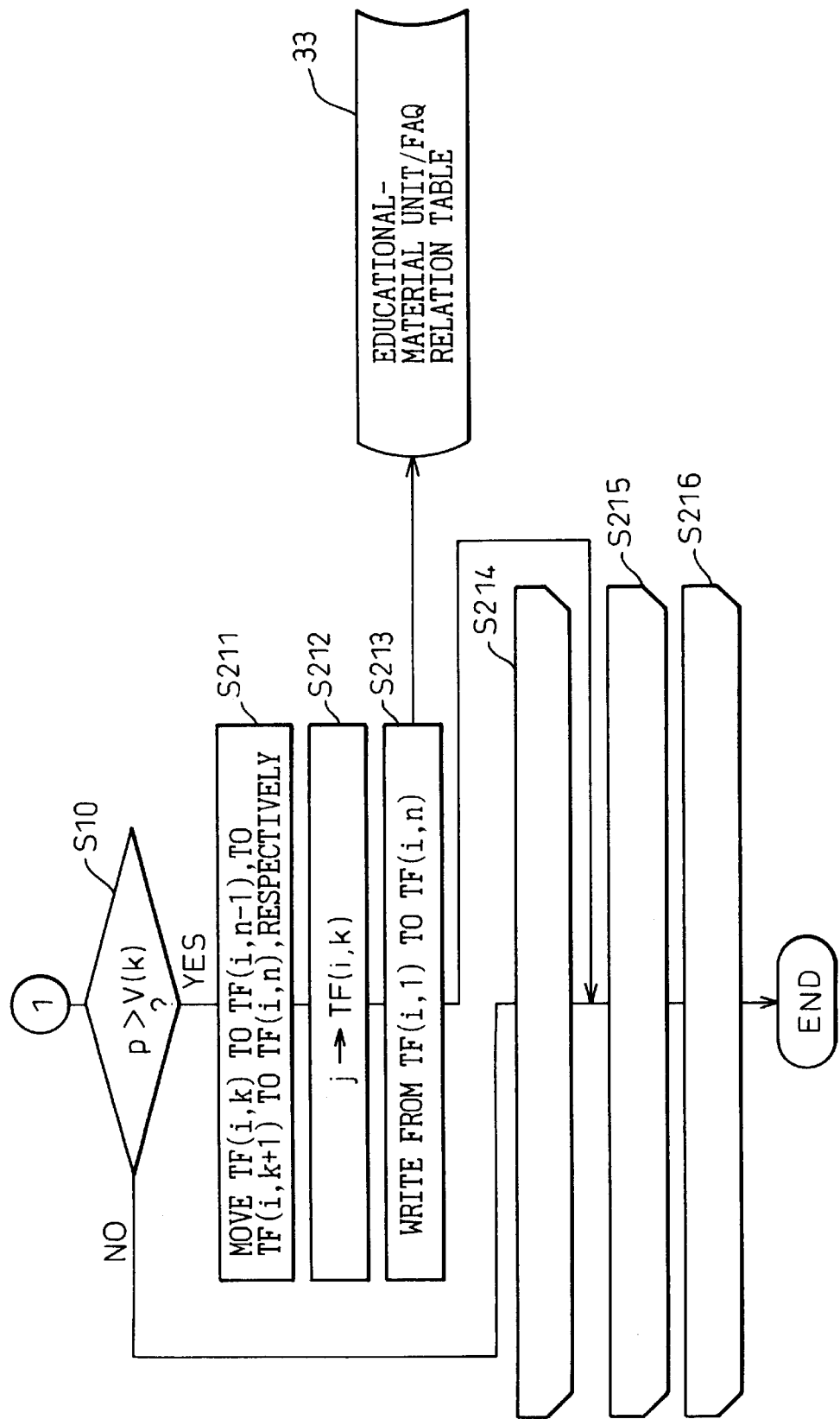

Fig. 8

EDUCATIONAL-MATERIAL UNIT/FAQ RELATION TABLE 33

| EDUCATIONAL-MATERIAL UNIT NUMBER | FAQ NUMBER (RANK 1) | FAQ NUMBER (RANK 2) | FAQ NUMBER (RANK 3) | FAQ NUMBER (RANK 4) | FAQ NUMBER (RANK 5) |
|---|---|---|---|---|---|
| 276 | 236 | 138 | 173 | 259 | 378 |
| ... | ... | ... | ... | ... | ... |

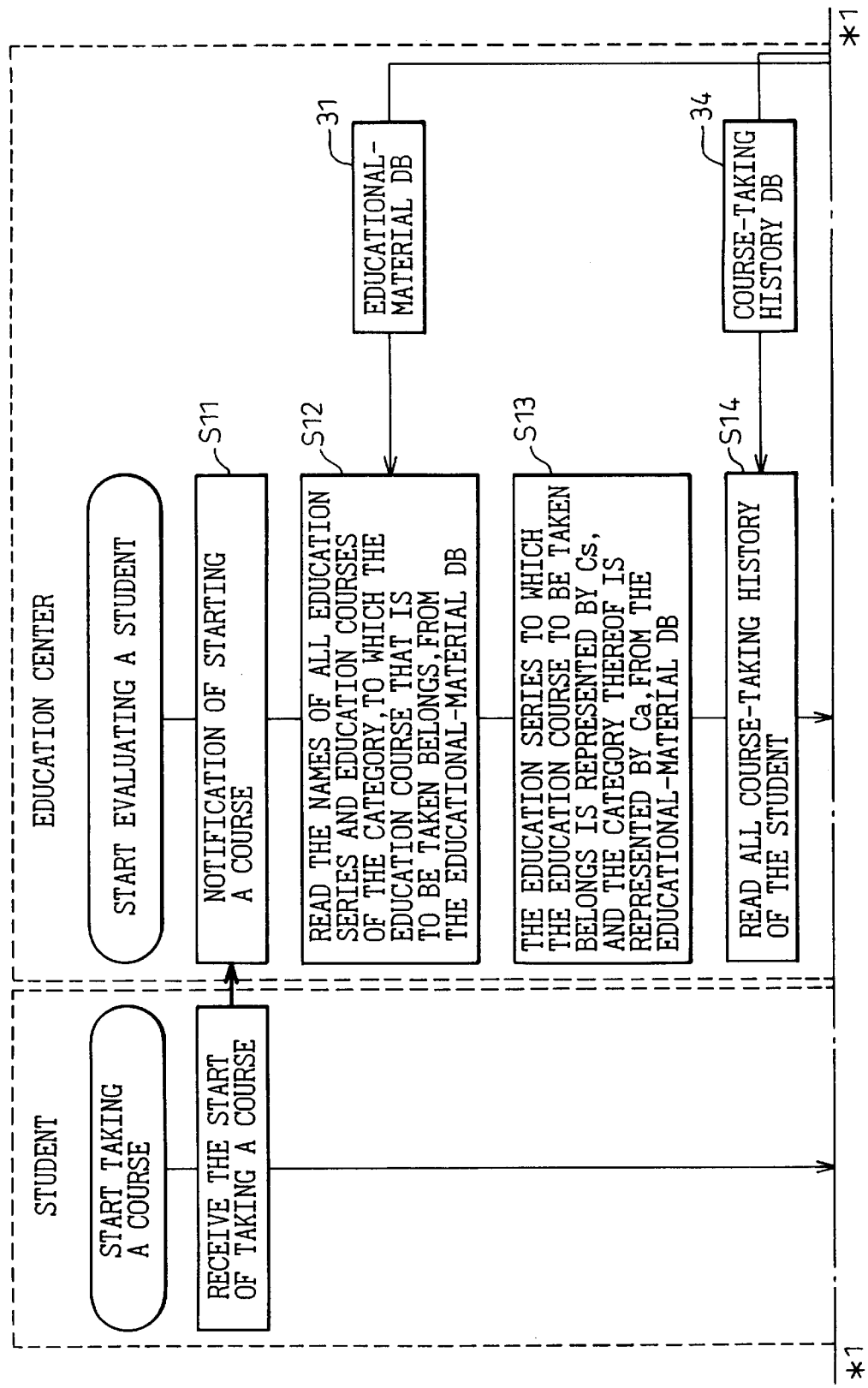

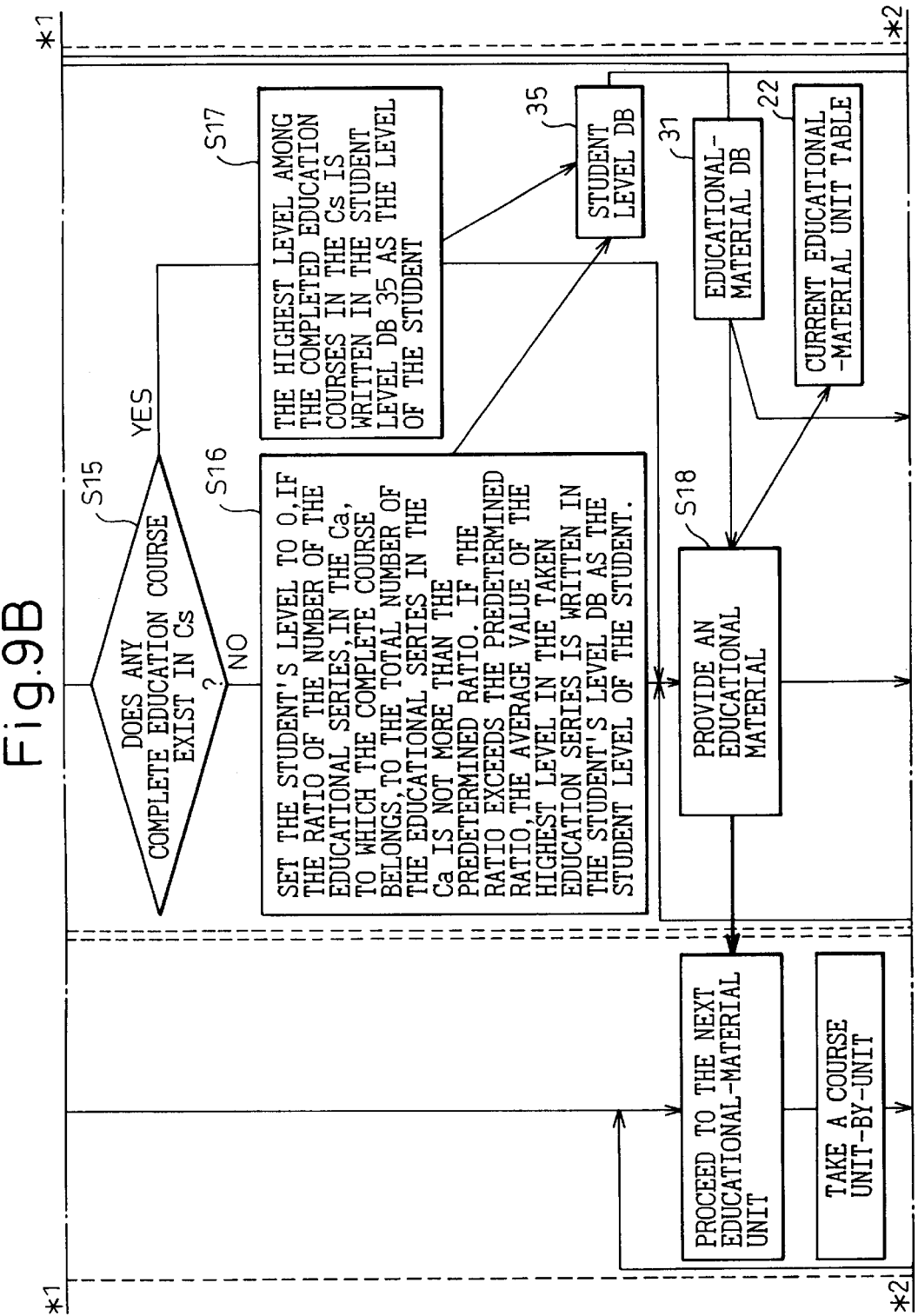

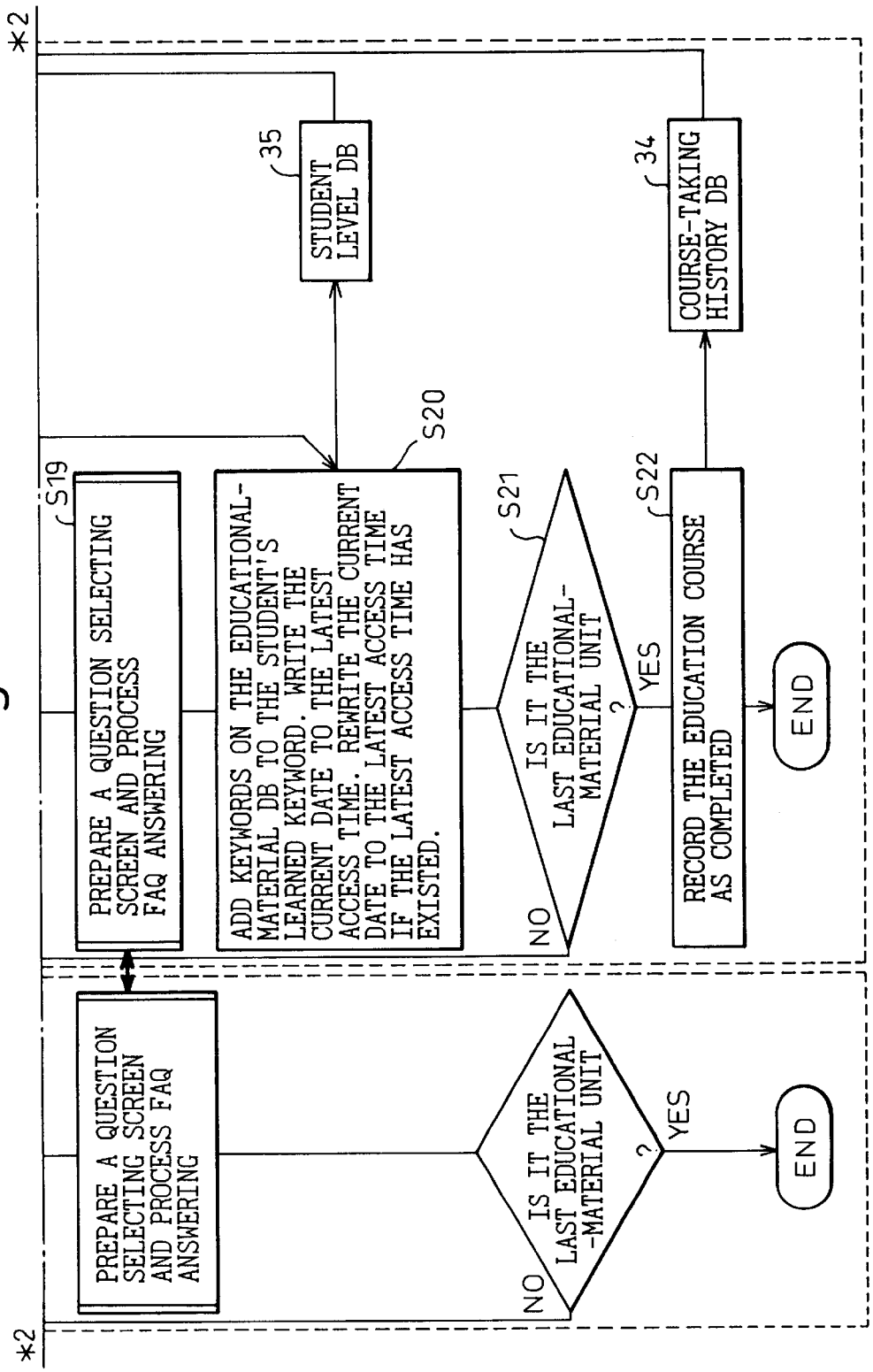

Fig.10

STUDENT HISTORY DB 34

| NAME OF STUDENT | NAME OF COMPLETED EDUCATIONAL-MATERIAL COURSE | COMPLETE DATE OF COURSE | LEVEL OF EDUCATION COURSE |
|---|---|---|---|
| II LEARNING | LAN ADVANCED | 2001.10.29 | 3 |
| | ... | ... | ... |
| | ... | ... | ... |
| | ... | ... | ... |
| ... | ... | ... | ... |
| | ... | ... | ... |

Fig.11

STUDENT LEVEL DB 35

| NAME OF STUDENT | STUDENT LEVEL | LEARNED KEYWORD | LATEST ACCESS DATE (THE LATEST DATE SHOWN IN EDUCATIONAL-MATERIAL UNIT) |
|---|---|---|---|
| II LEARNING | 2 | NETWORK LAYER | 2001.08.12 |
| | | TCP/IP | 2001.12.05 |
| | | IP ADDRESS | 2001.12.05 |
| | | OSI REFERENCE MODEL | 2001.08.12 |
| | | ... | ... |
| ... | ... | ... | ... |
| | | ... | ... |

CURRENT EDUCATIONAL-MATERIAL UNIT TABLE 22

| NAME OF STUDENT | CURRENTLY LEARNED EDUCATIONAL-MATERIAL UNIT NUMBER |
|---|---|
| II LEARNING | 276 |
| ... | ... |

PRESS THE FAQ SEARCH REQUEST BUTTON

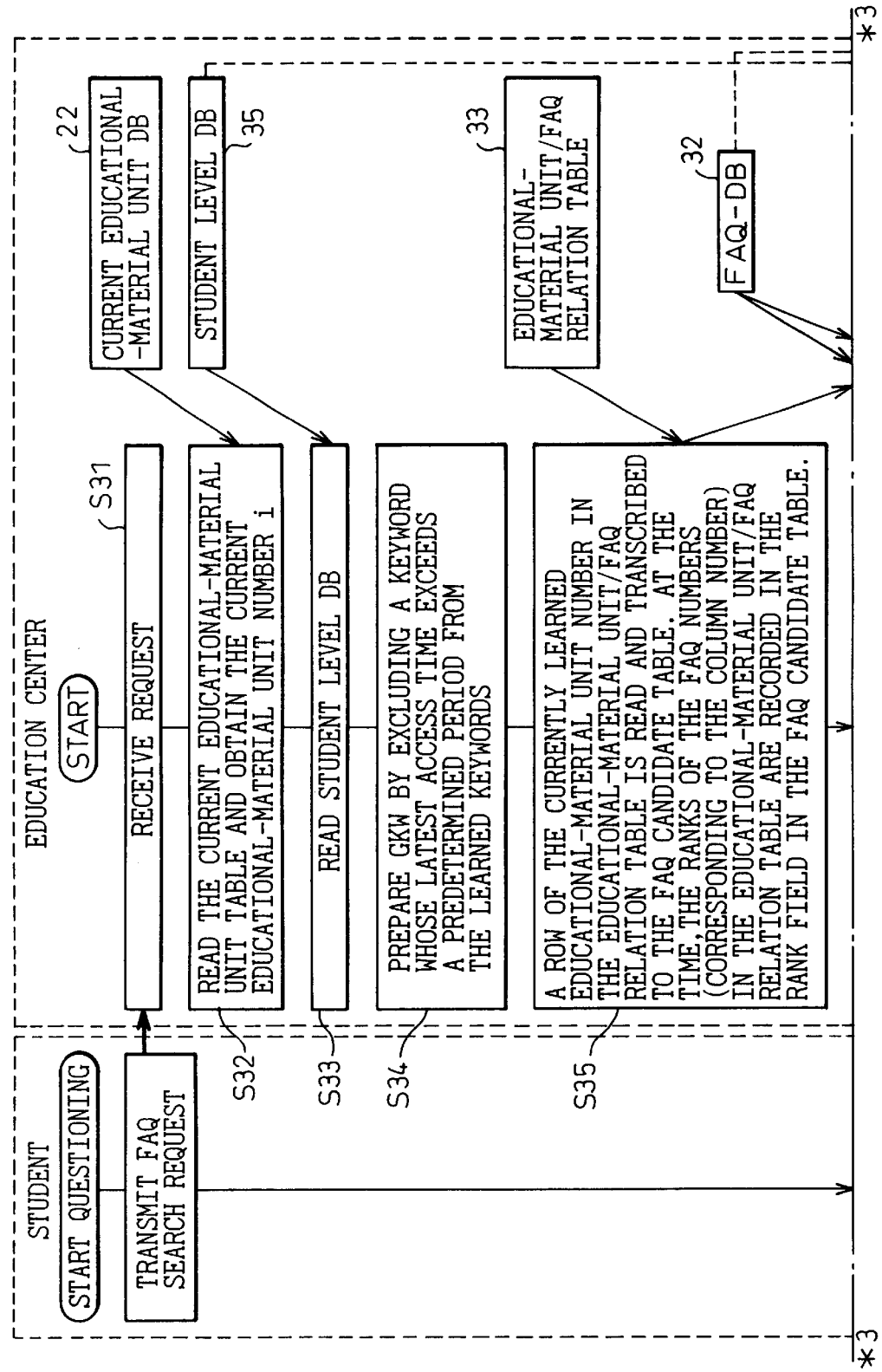

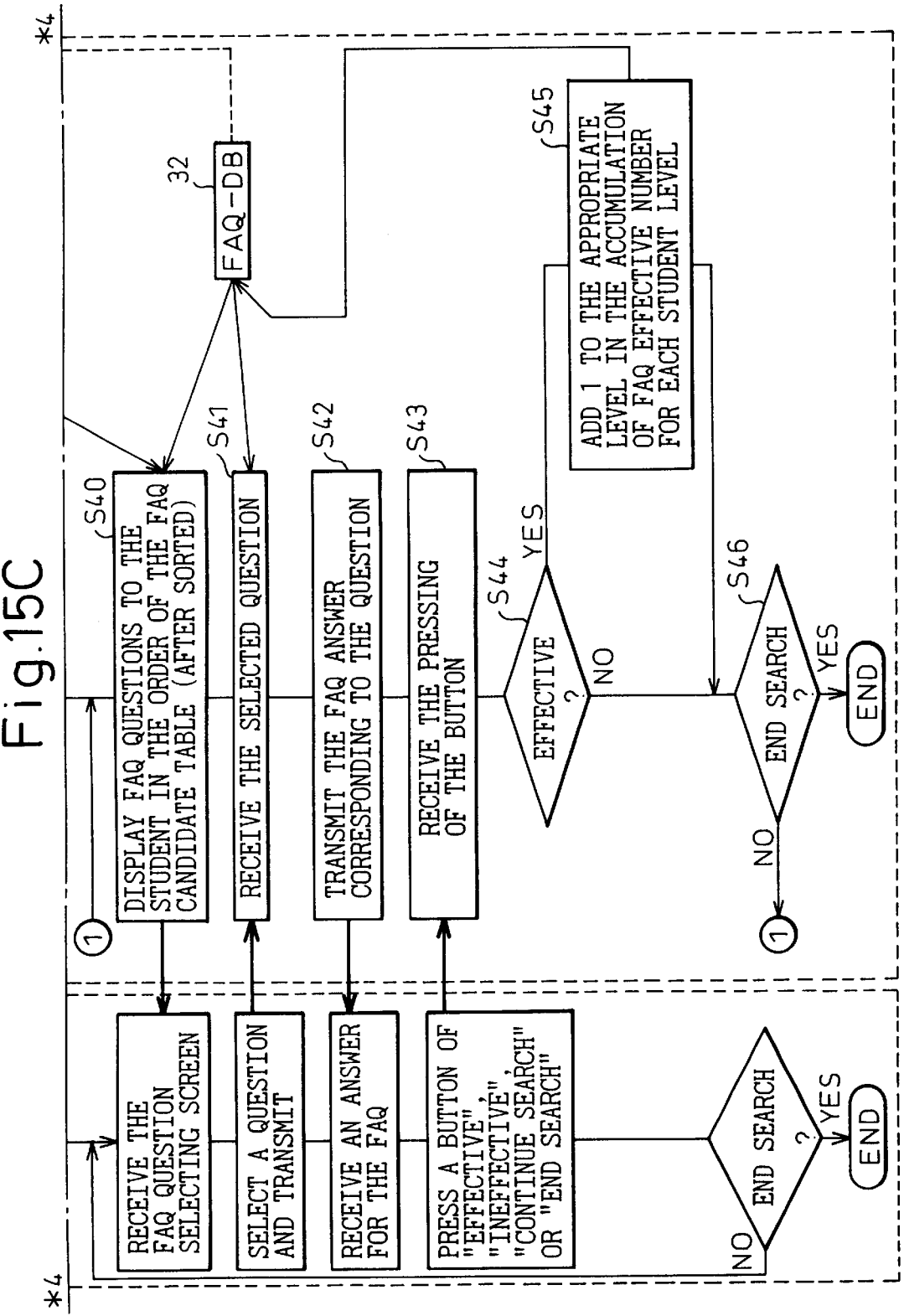

Fig.16

FAQ CANDIDATE TABLE

| FAQ | LEVEL | LEVEL DIFFERENCE | KEYWORD DIFFERENCE | RANK |
|-----|-------|------------------|--------------------|------|
| 125 | 2 | 0 | 5 | 1 |
| 138 | 4 | 2 | 8 | 2 |
| 173 | 1 | 1 | 10 | 3 |
| 259 | 2 | 0 | 3 | 4 |
| 378 | 3 | 1 | 8 | 5 |

Fig.17

STUDENT LEVEL-FAQ LEVEL→D

WHEN D=0, LEVEL DIFFERENCE IS 0
WHEN D=1 OR D=-1, LEVEL DIFFERENCE IS 1
WHEN D=2 OR D=-2, LEVEL DIFFERENCE IS 2
WHEN D=3 OR D=-3, LEVEL DIFFERENCE IS 3
WHEN D=4 OR D=-4, LEVEL DIFFERENCE IS 4
WHEN D=5 OR D=-5, LEVEL DIFFERENCE IS 5

Fig.18

FAQ CANDIDATE TABLE (AFTER SORTED)

| FAQ | LEVEL | LEVEL DIFFERENCE | KEYWORD DIFFERENCE | RANK |
|---|---|---|---|---|
| 125 | 2 | 0 | 5 | 1 |
| 259 | 2 | 0 | 3 | 4 |
| 173 | 1 | 1 | 10 | 3 |
| 378 | 3 | 1 | 10 | 5 |
| 138 | 4 | 2 | 8 | 2 |

Fig.19

IS THE QUESTION YOU WANT TO ASK SHOWN BELOW?
IF IT IS, CLICK THE NUMBER. IF NOT, PRESS THE
CREATE QUESTION BUTTON TO PREPARE YOUR
QUESTION DIRECTLY.

① WHAT ARE THE HOST ADDRESS OF TCP/IP
   AND THE NETWORK ADDRESS?
② IS THE ADDRESSING ···
       ⋮

CLICK ①

| CREATE QUESTION | BACK |

Fig.20

FAQ ANSWER -NO.1-

QUESTION: WHAT ARE THE HOST ADDRESS OF TCP/IP AND THE NETWORK ADDRESS

ANSWER: THE HOST ADDRESS IS DESCRIBED AT THE DESCENDENT OF THE IP ADDRESS IN TCP/IP···

...

| EFFECTIVE, CONTINUE SEARCH | EFFECTIVE, END SEARCH | INEFFECTIVE, CONTINUE SEARCH | INEFFECTIVE, END SEARCH |

METHOD FOR PRESENTING MOST SUITABLE QUESTION AND APPARATUS FOR PRESENTING MOST SUITABLE QUESTION

BACKGROUND OF THE INVENTION

1. Field of the Invention

The present invention relates to a method for presenting a question in an education system using a computer, wherein a question prepared beforehand is presented to a student so that the student can easily raise a question.

The present invention also relates to an apparatus for performing the method for presenting a most suitable question.

2. Description of the Related Art

There is an education system using a computer. The education system is constituted by connecting a host computer at an education center and plurality of students' terminals through a network such as Internet.

In this education system, educational-materials are transmitted by unit from the education center to the students' terminals through the network. The students proceed to learn using the received educational-materials. In this education system, students transmit questions from their terminals to the education center when they have a question.

In the above-mentioned education system, a problem resides in that it is difficult for a student to properly inform an instructor what he/she wants to ask.

In group education where an instructor faces a plurality of students, the instructor can grasp an intention of a question through a conversation with a questioner, even if the content of the question is not clear. Thus, the student can obtain an answer as intended.

On the other hand, in the above education system using a computer, it is difficult for a student to ask a question while having a conversation with an instructor. Thus, it has been practiced that the education center prepares questions and answers thereto with regard to previously anticipated questions (FAQ: Frequently Asked Questions), and presents the FAQ questions.

When a student asks a question, the student searches a large number of FAQ questions prepared by the education center to obtain a question which matches his/her question. Then, the student transmits the question to the education center. In response, the answer to the question is automatically retrieved in the education center and is transmitted to the terminal of the student. Accordingly, the questioner can properly inform the education center of the question and can obtain an answer as intended.

Generally, a search in FAQ questions is performed by using a keyword. However, it is difficult for a student who is in the process of acquiring knowledge, by taking lessons, to select a proper keyword. Thus, there is a problem that the student obtains only meaningless information through the search and has difficulty in selecting a question as intended because the student cannot select a proper keyword.

SUMMARY OF THE INVENTION

The object of the present invention is to present a question that is most suitable, for a user, using a method for presenting questions by a host computer which receives questions from users.

Also, the object of the present invention resides in providing an apparatus capable of presenting most suitable questions.

The present invention was invented to attain the above-mentioned objects. In the present invention, when a host computer for receiving questions from users receives question search request information from a student's terminal, the host computer retrieves a question, which matches a keyword contained in the question search request information, from a question storing means for storing a plurality of questions. Then, the retrieved questions are sorted in accordance with the level of the student, which is specified by the question search request information. The sorted questions are transmitted to the student's terminal.

According to the present invention, when searching for questions, a question appropriate to the user's level is presented with higher priority. Thus, even a user having little knowledge can quickly find a question describing what he/she has intended. Then, the user can obtain an answer as intended, promptly and accurately.

BRIEF DESCRIPTION OF THE DRAWINGS

The above objects and features of the present invention will be more apparent from the following description of the preferred embodiment with reference to the accompanying drawings, wherein:

FIG. 3 shows a relationship between the education courses of FIG. 2 and educational-material units.

FIG. 4 shows a data layout of an educational-material DB in FIG. 1.

FIG. 5 shows a data layout of a FAQ-DB in FIG. 1.

FIGS. 7A and 7B are flow charts showing a preparing operation for an education-material unit/FAQ relation table.

FIG. 8 is a data layout of the educational-material/FAQ relation table in FIG. 1.

FIGS. 9A, 9B and 9C are flow charts showing a flow of taking a course, in the operation of FIG. 6.

FIG. 10 shows a data layout of a student history DB in FIG. 1.

FIG. 11 shows a data layout of a student level DB in FIG. 1.

FIGS. 15A, 15B and 15C are flow charts showing a process of preparing a question selecting screen and answering the FAQ.

FIG. 16 shows a data layout of a FAQ candidate table in FIG. 1.

FIG. 17 shows a relation between a student's level and a FAQ level.

FIG. 18 shows the FAQ candidate table (after being sorted) in FIG. 1.

FIG. 19 shows a FAQ question selection screen according to the present invention.

FIG. 20 shows a FAQ answer screen according to the present invention.

DESCRIPTION OF THE PREFERRED EMBODIMENTS

An embodiment of the present invention will be explained using the figures.

Figure 1:
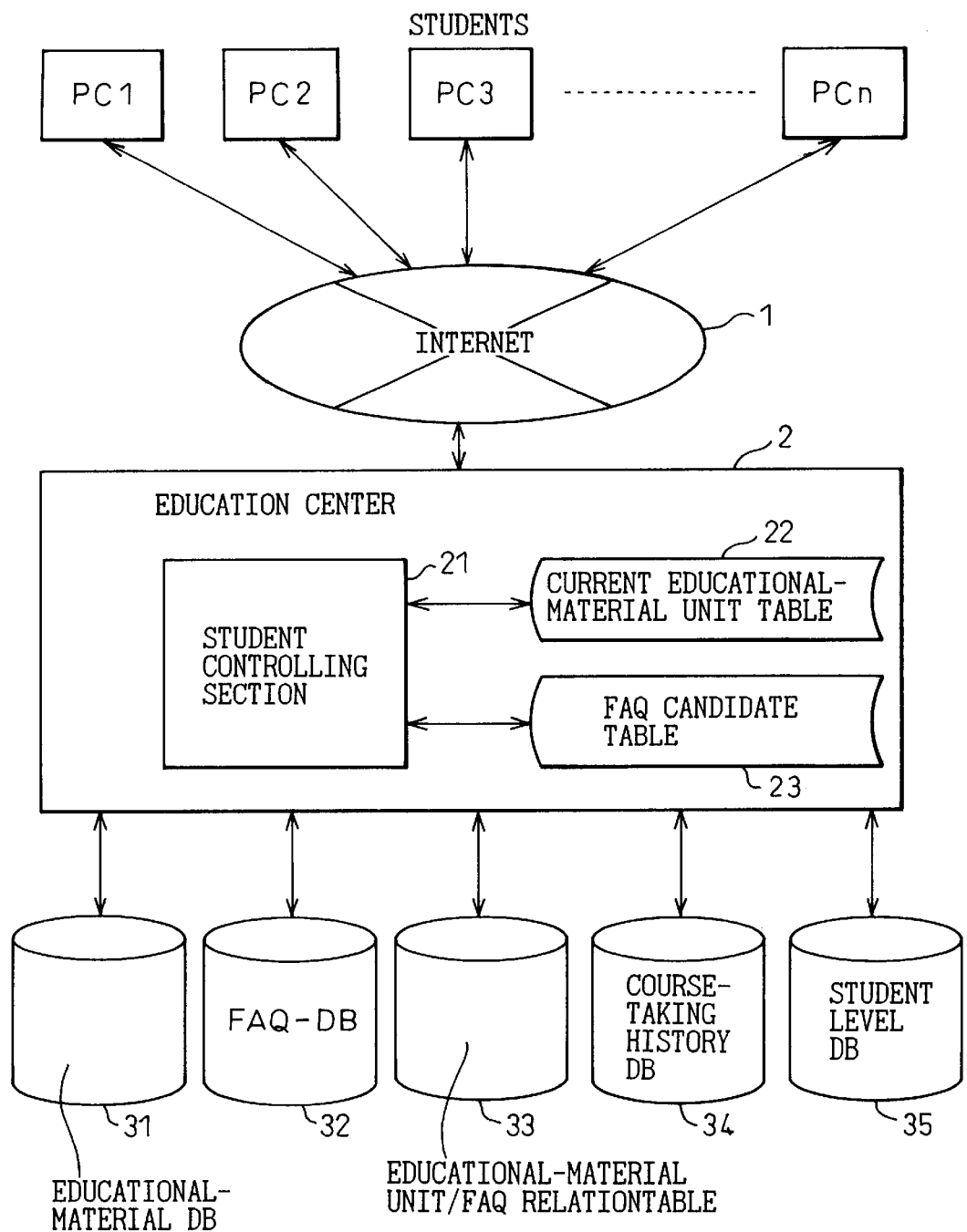
FIG. 1 shows a constitution of an education system implementing a method for presenting a most suitable question according to the present invention.

FIG. 1 is a block diagram of an education system implementing a method for presenting a most suitable question according to the present invention.

In an education center 2, a student controlling section 21, which operates as a host computer, is installed.

A plurality of students' terminals PC1 to PCn are connected to the student controlling section 21 through a network 1.

The student controlling section 21 is provided with a educational-material DB 31 ("database" is abbreviated as "DB"), FAQ-DB32, educational-material unit/FAQ relation table DB 33, a student history DB 34, and a student level DB 35. Further, a current educational-material unit table 22 and a FAQ candidate table 23 are provided. Contents of each DB and table will be described later.

The students' terminals PC1 to PCn are constituted by personal computers.

The network 1 is constituted by Internet, LAN, a dedicated line, or the like.

Using FIG. 2, FIG. 3 and FIG. 4, education courses and educational-materials in the education system will be explained.

The education courses and the educational-materials are categorized into "Network", "OS", "Literacy", and so on, as the highest category.

Figure 2:
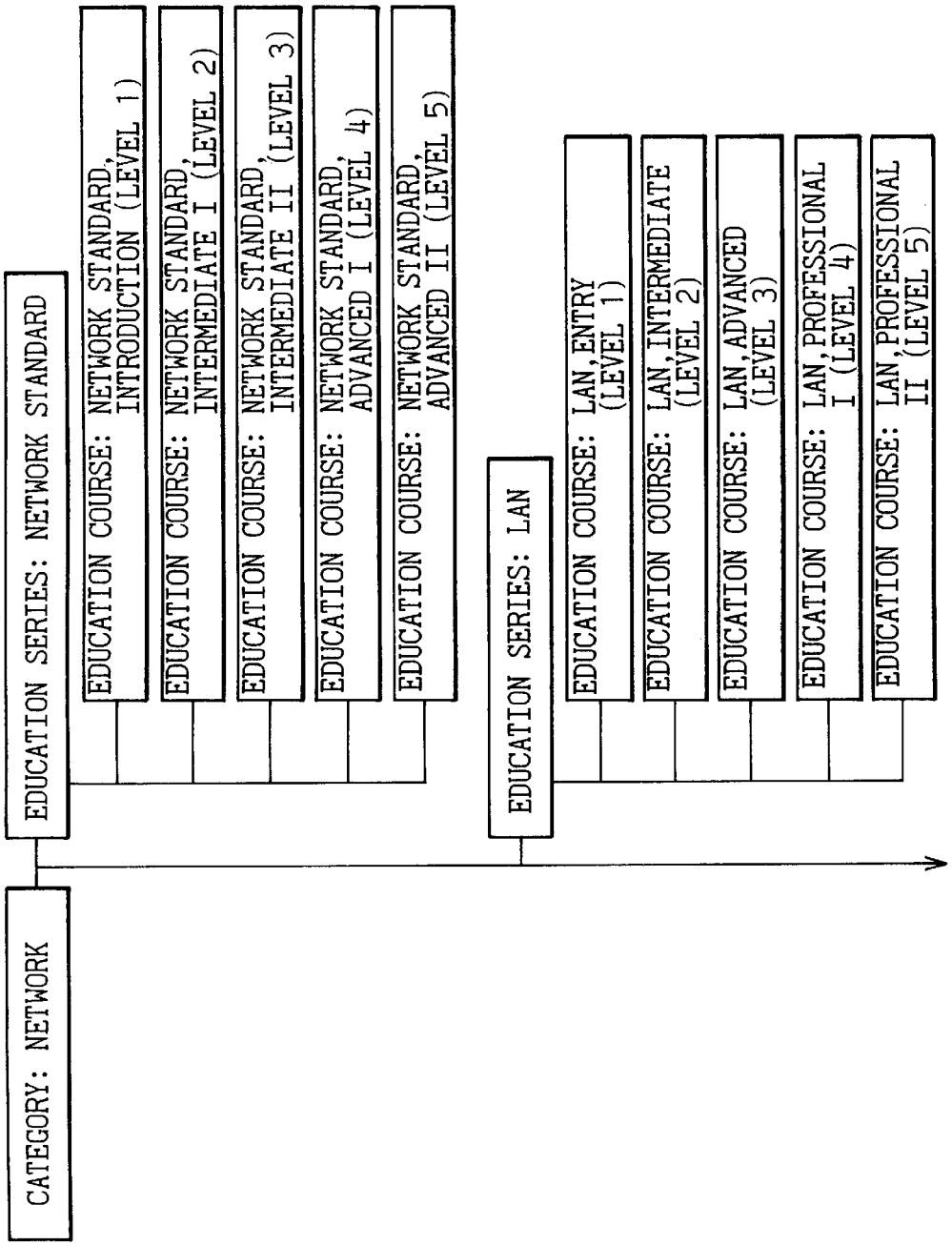
FIG. 2 shows a structure of education courses in the education system of FIG. 1.

FIG. 2 shows a structure of the category "Network".

The category is further categorized into education series such as "Network Standard", "LAN".

The education series is still further categorized into education courses such as "Network Standard, Introduction (Level 1)" to "Network Standard, Advanced II (Level 5)", "LAN Entry (Level 1) to "LAN Professional II (Level 5)", and so on.

Each education course is assigned a level such as Level 1, Level 2 and Level 3. The larger number means the higher level. The level is adapted to the level of a student.

As shown in FIG. 3, one education course includes plurality of educational-material units. In the illustrated example, the education course of "Network Standard, Intermediate" includes a plurality of educational-material units 1 to n.

Each educational-material unit is stored in the educational-material DB 31 in FIG. 1.

FIG. 4 shows a data layout of the educational-material DB 31. Although a large number of educational-material units are recorded in the educational-material DB 31, the structure of only one educational-material is shown in the figure.

A specific "Educational-material unit number" is assigned to an educational-material unit. The "Category" and the "Education course" to which the educational-material unit belongs, and the "Entity of educational-material unit" which is the content of the educational-material unit are recorded.

A level value of the education course is recorded in "Level". In the illustrated education course, "Network Standard, Intermediate" is Level 2, as explained in FIG. 2.

Further, a keyword to be learned by taking the educational-material unit (learning keyword) and a keyword which has been learned before taking the educational-material unit (precondition keyword) are recorded. The method for using a learning keyword and a precondition keyword will be explained later.

The education center 2 prepared questions and answers thereto regarding previously anticipated questions (FAQ) and recorded them in FAQ-DB 32.

FIG. 5 shows a content of FAQ-DB 32.

Although a large number of FAQ are recorded in FAQ-DB 32, only one FAQ is shown in the figure.

A specific "FAQ number" is assigned to each FAQ.

A FAQ is prepared for each category. The name "Network" is recorded in the "Category". "Accumulation of FAQ effective numbers for each student level" is indicated. The numeric value is obtained as follows.

At the creation of the FAQ-DB 32, the numerical value 1 is put in the student level which the creator of the FAQ-DB 32 thinks most suitable, and the numeric values are 0 in the other levels. After the operation of the education system begins, the accumulation of FAQ effective numbers is dynamically changed in accordance with the level of a student who uses the FAQ, as is explained below.

After a student starts taking a course and when the student has a question to ask, the student conducts a FAQ search to obtain a question which accurately expresses what he/she wants to ask. The student judges whether the question is effective or not for him/her and notifies the education center 2.

When the FAQ is judged as effective, 1 is added to the student level where the FAQ was judged as effective, in the accumulation of FAQ effective number in the FAQ-DB 32.

As a large number of students conduct FAQ searches, the effective numbers are accumulated for each student level, in the "accumulation of FAQ effective number for each student level". Accordingly, by looking at this entry, it can be verified to which student level the FAQ is most suitable.

In the FAQ-DB 32, contents of questions and contents of answers to the questions are recorded in "Question" and "Answer".

Keywords extracted from the questions and answers are recorded in "Question keyword" and "Answer keyword".

The outline of the operation of the student controlling section 21 in the education system of FIG. 1 will be explained using a flow chart in FIG. 6.

Here, the above mentioned educational-material DB 31 and the FAQ-DB 32 have already been prepared.

Using the educational-material DB 31 and the FAQ-DB 32, an educational-material unit/FAQ relation table 33 is prepared (A1). The educational-material unit/FAQ relation table 33 examines the matching degree of keywords in the educational-material unit and FAQ and shows the FAQ, in the order from the FAQ having highest matching degree, for each educational-material unit.

When a request for starting a course is received from a student (A2), a level of the student is judged (A3). By comparing the judged student's level and the FAQ level, the FAQ suitable for the student is presented.

Educational-material is transmitted to the student's terminal PC (A4). The student starts the course using the received educational-material.

When the student asks a question, the student transmits a FAQ search request. When the request is received (A5), a FAQ question selecting screen is prepared and presented to the student (A6).

The screen shows FAQ questions in the order from a question which is considered to be most suitable for the student asking the question. Accordingly, the order of FAQ is determined based on the matching degree of the student level and the FAQ level, the mismatching degree between the learning keywords of the student and the FAQ keywords, and the matching degree of the keywords in the educational-material unit being learned and the FAQ. Accordingly, the student can promptly reach the most suitable question.

When the student selects a question which matches his/her question, from a plurality of questions, the student controlling section 21 receives the selected question and transmits the answer to the question to the student (A7).

The student who received the answer judges whether the question was effective or not, and the student controlling section 21 receives the evaluation thereof (A8).

When the student is not satisfied with the answer, the process returns to A5 and receives a FAQ search request again. When the student is satisfied with the answer, the educational-material unit is ended. At this point, the student level DB 35 and the student history DB 34 is updated (A9). By these updating of DB 34 and 35, the displaying order of FAQ displayed on the FAQ question selecting screen will be changed in the subsequent educational material, in accordance with the leaning progress situation of the student.

Then, when the student proceeds to the subsequent educational-material, the process returns to the step A2. If all educational-materials are completed, the process of FIG. 6 ends.

Next, the operation of the student controlling section 21 will be explained in detail.

Figure 6:
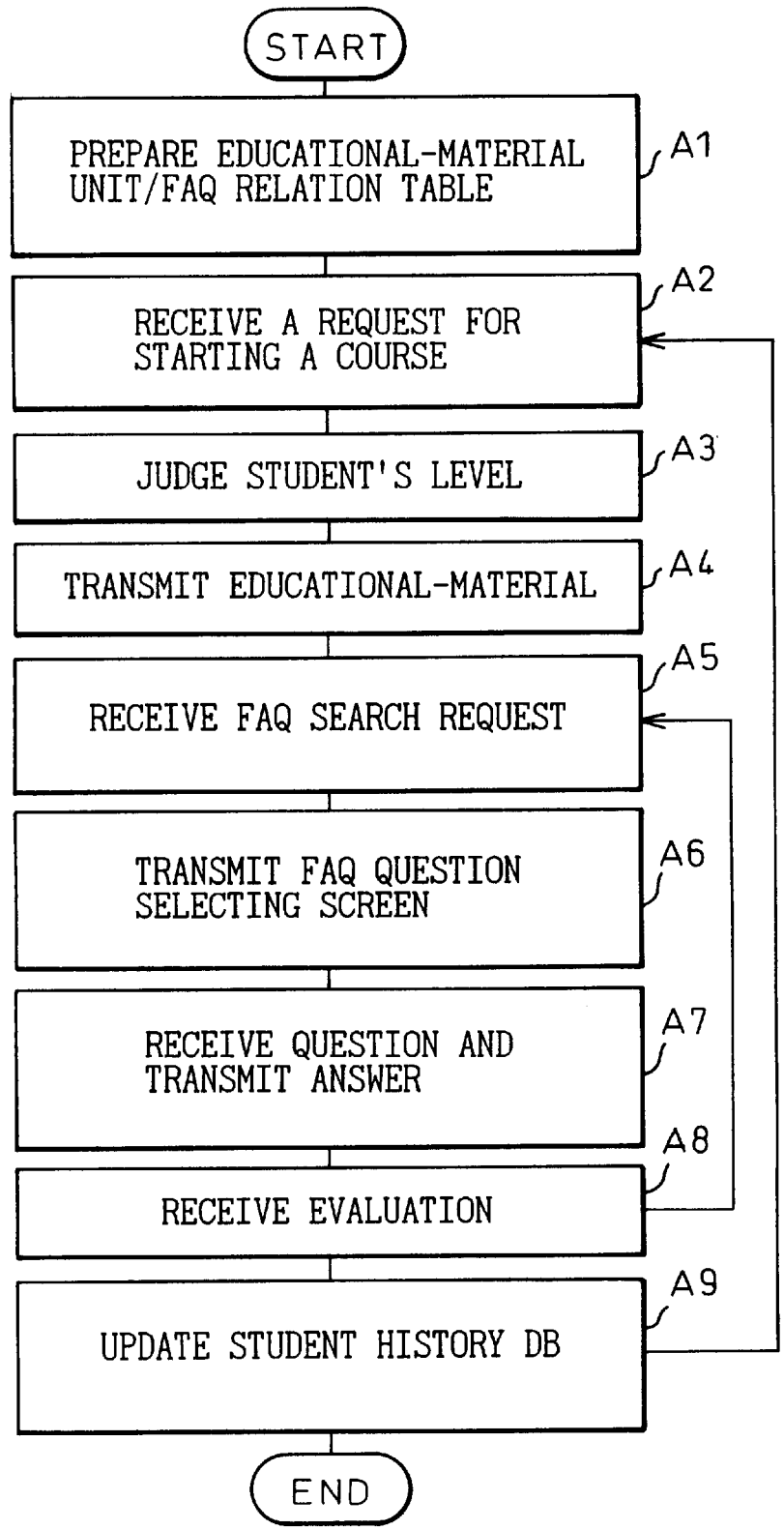
FIG. 6 is a flow chart generally showing operations of the education system in FIG. 1.

Using the flow charts in FIGS. 7A, 7B and 7C, the process of preparing the education-material unit/FAQ relation table 33 in the step A1 of FIG. 6 is explained.

At first, the creator prepares (creates) the educational-material unit/FAQ relation table 33 (S1).

FIG. 8 shows the data layout of the education-materials unit/FAQ relation table 33.

In the table, for each educational-material unit number (FIG. 4), each FAQ is ranked and FAQ numbers are arranged in accordance with the rank. The rank is determined based on a p value of each FAQ. The p value is a value counted in the process of the step S2 and later and shows a matching number between the keywords in the educational-material unit and the keywords in the FAQ. Accordingly, a larger p value means a closer relationship between the educational-material unit and the FAQ. The p value is blank at the time of creation.

By repeating the step S2 to the step S216, the process of calculating p value of the FAQ and sorting the FAQ is performed for all educational-material units recorded in the educational-material DB 31 (FIG. 4).

The educational-material unit number (FIG. 4) is represented by a variable i, and the variable i is incremented by 1 for each return from the step S216 to the step S2. Thus, the variable i takes on a value of 1 to m (the total number of the educational-materials).

In the step S3, one educational-material unit (i) is read from the educational-material DB 31. The V(j) is reset to 0 (S4). The V(j) represents a function to calculate the above-mentioned numerical value p of the FAQ.

When the V(j) is reset, the step S5 to the step S215 are repeated for one educational-material unit, and the process for determining the ranks of the all FAQ is performed. The FAQ number (FIG. 5) is represented by the variable j, which is incremented by 1 each time the process returns from the step S215 to the step S2. The variable j takes on a value of 1 to n (the total number of the FAQ).

In the step S6, one FAQ(j) is read from the FAQ-DB 32.

In the step S7, the educational-material unit keywords (FIG. 4) read in the step 3 are compared to the FAQ keywords (FIG. 5) read in the step S6, and the matching keywords are counted. The result V(j) is the p value for FAQ(j).

In the step S8, the elements TF (i, 1) to TF (i, n) are read from the educational-material unit/FAQ relation table 33 (FIG. 8). Here, the TF (i, j) is the element of the table 33. The i was explained in the step S2, the j was explained in the step S5. In the step S8, FAQ 1 to n of the ith educational-material unit is read.

At the creation of the educational-material unit/FAQ relation table 33 (S1), p values of the all elements TF are blank. As the process of FIGS. 7A–7C proceeds, the p value of each FAQ is counted and recorded in the table 33. In the example of FIG. 8, the FAQ numbers 125, 138 . . . are recorded regarding the educational-material unit number i=276.

By repeating the process from the step S9 to the step S214, the rank (the position written in the education-material unit/FAQ relation table 33) of the FAQ which was read in the step S6 and counted the p value thereof, is determined.

The p value of each element TF is shown as V(k). Every time the process returns from the step S214 to the step S9, the variable k is incremented by 1 and takes on values from 1 to n (total number of the FAQ).

The judgement whether p>V(k) is performed (S10). The p is the value counted at this time in the step S7. The V(k) is the p value of the kth FAQ read from the educational-material unit/FAQ relation table 33 in the step S8. If the result of step 10 is No, the process returns to S9 and k is incremented.

If p>V(k) (the result of S10 is Yes), each FAQ number of kth and thereafter is shifted by 1 (k+1) (shifted in the right direction in FIG. 8). Here, the FAQ number j is determined as kth (step S212) and the result is written in the educational-material unit/FAQ relation table (step S213).

By repeating the process of steps S9 to S214, the rank of one FAQ read from the FAQ-DB 32 in the step S6 is determined and recorded at the specified rank in the educational-material unit/FAQ relation table 33.

By repeating the process from the step S5 to the step S215, all FAQ are ranked in the educational-material unit/FAQ relation table 33, with regard to the one educational-material unit read from the educational-material DB 31 in the step S3.

By repeating the process from the step S2 to the step S216, the educational-material unit/FAQ relation table 33 for the all educational-material units are completed.

In thus obtained educational-material unit/FAQ relation table 33, the FAQ are arranged in the order from the FAQ having closest relation to the educational-material unit that the student is learning. By using the table 33, the FAQ which matches the question from the student can be presented in order. The method of use will be explained below.

The flow charts of FIGS. 9A, 9B and 9C integrally show the details of the course-taking process of the step A2 to S9 in FIG. 6.

A level of a student is set in the steps S11 to S17.

When a student starts taking a course, the student notifies the start of the course to the education center 2.

When the student controlling section 21 receives the notification of starting the course from the student (S11), the names of all education series and education courses of the category, to which the education course that is to be taken belongs, are read from the educational-material DB 31 (FIG. 4) (S12). The education series, to which the education course to be taken belongs, is represented by Cs, and the category thereof is represented as Ca (S13).

Next, all of the course-taking history of the student are read from the student history DB 34 (S14).

FIG. 10 shows a data layout of the student history DB 34.

Here, "Name of completed education course", "Completion date of course" and "Level of education course" are recorded for each student.

The student controlling section 21 judges whether there exists any completed education course in the education series Cs (S15). If it exists, the highest level among the completed education courses in the education series Cs is written in the student level DB 35 as the level of the student (S17).

As is explained later, when the student searches the FAQ, the FAQ in the level matching the student's level is presented to the student with higher priority.

FIG. 11 shows a data layout of the student's level DB 35.

The student's level DB 35 is constituted by "Name of student", "Level of student", "Learned keyword" and "Latest access date". The student's level DB 35 is updated when the education-material unit is completed.

On the other hand, if no completed education course exists in the education series Cs (a concrete example will be described later), it is checked whether there exists any education series taken in the category Ca. Next, the ratio of the number of the taken education series to the total education series in the category Ca is checked.

Here, if the ratio of the number of the taken series to the total number is not more than the predetermined ratio, the student's level for the education series is set to be "0". If the ratio is more than the predetermined ratio, the highest level in each taken education series is obtained and the average value thereof is written in the student's level DB as the level of the student (S16).

Figure 12:
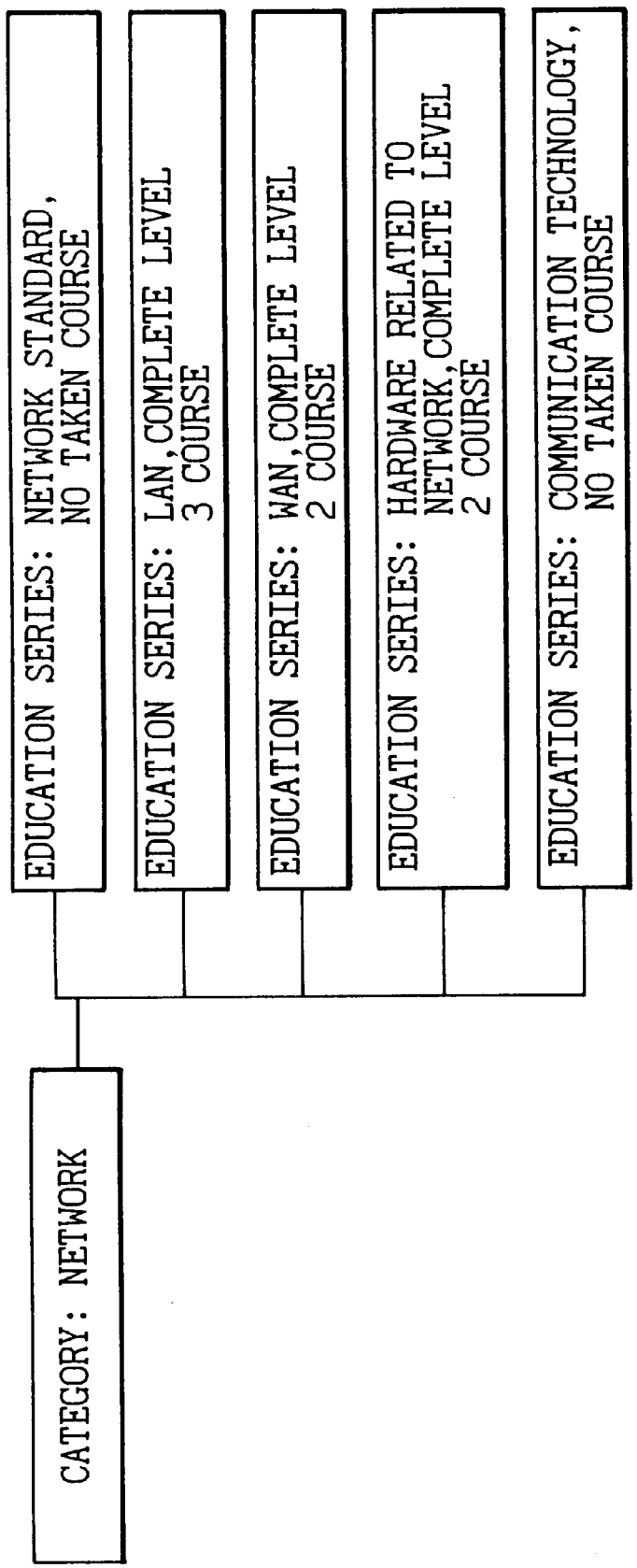
FIG. 12 shows an example of setting a student's level.

Using FIG. 12, a concrete example of the student's level when no completed course exists in the education series Cs exists.

Suppose that a student starts taking an education course in the education series Cs: "Network Standard" and the category Ca: "Network".

The category Ca: "Network" includes the education series "LAN", "WAN", "Hardware Related to Network" and "Communication Technology", other than: "Network Standard".

The student has not taken the education series of "Network Standard" and "Communication Technology", but already taken "LAN", "WAN" and "Hardware Related to Network". In this case, because the majority of the education series in the category Ca is taken, the level of the taken education series is checked.

Here, the highest level in the education series "LAN" is Level 3, that of "WAN" is Level 2 and that of "Hardware Related to Network" is Level 2. The average value is 2.33, which is rounded down and Level 2 is set.

When the student's level is set, the student controlling section 21 retrieves educational-materials for each educational-material unit from the educational-material DB 31 (FIG. 4) and provides them to the student (S18). The provided education-materials are recorded in the current educational-material table 22.

Figures 13, 14:
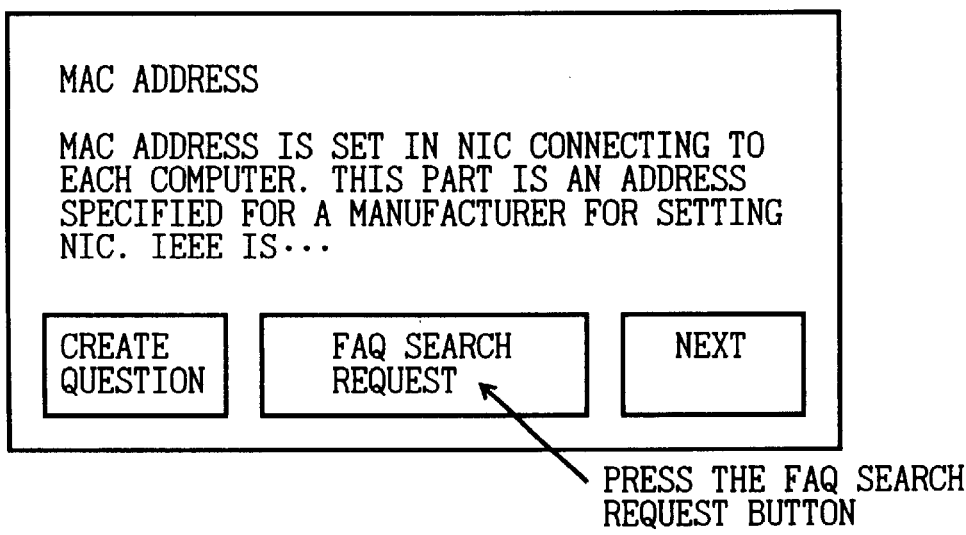
FIG. 13 shows a data layout of a current educational-material unit table.
FIG. 14 shows a lesson screen in the present invention.

FIG. 13 shows a data layout of the current educational-material table 22.

Here, the number of the currently learned educational-material unit is recorded for each student. As the student proceeds with learning, the content of the table 22 is updated.

The student receives the educational-material unit and proceeds with learning unit-by-unit.

FIG. 14 shows a lesson screen.

In the shown example, the explanation on the educational-material unit "MAC address" is displayed.

At the lower part of the screen, "Next" button for proceeding to the next educational-material, "Create Question" button for raising a question from the student and "FAQ Search Request" button are provided.

When the student has a question to ask, he/she notifies to the education center 2.

If the student creates the question by himself/herself, the student presses the "Create Question" button, creates a question along with the guide on the screen, and transmits the question to the education center 1. Because the creation of a question is not different from that in the prior arts, a detailed explanation is omitted here.

When the student wants to select a FAQ from questions prepared by the education center 2 side in advance, the student presses the "FAQ Search Request" button on the screen.

When receiving the FAQ search request, the student controlling section 21 prepares a question selecting screen and transmits it to the student. When the student selects a question, an answering process thereto is performed (S19). The details of the step S19 will be explained later using FIGS. 15A, 15B and 15C.

Upon completion of the process of the step S19, the learning of one educational-material unit is complete. Then, the student controlling section 21 extracts keywords from the educational-material DB 31 (FIG. 4), regarding the completed educational-material unit, and adds the keywords to the learned keyword in the student level DB 35 (FIG. 11). Accordingly, the number of learned keywords of the student increases and the question selecting screen presented to the student at the next lesson is changed, as is explained later. Namely, a question that the student has already learned will be ranked lower when displayed.

In the student level DB 35, the current date is also written (S20). If a keyword to be added has already recorded been in the DB 35, only the latest access date is updated. If this date becomes too old, the keyword is deleted from the learned keyword of the student, as is explained later.

Next, a judgement whether the completed educational-material unit is the last educational-material unit of the educational course or not is performed (S21). If it is not the last educational-material unit, the process returns to the step S18 and the next educational-material unit is provided to the student. The student proceeds to the next educational-material unit being received.

If it is the last educational-material unit (the result of step S21 is Yes), it is recorded in the student history DB 34 (FIG. 10) and the education course is recorded as completed (S22).

Then, a receipt of a notification of starting a course from a student will be waited for.

Figure 15B:
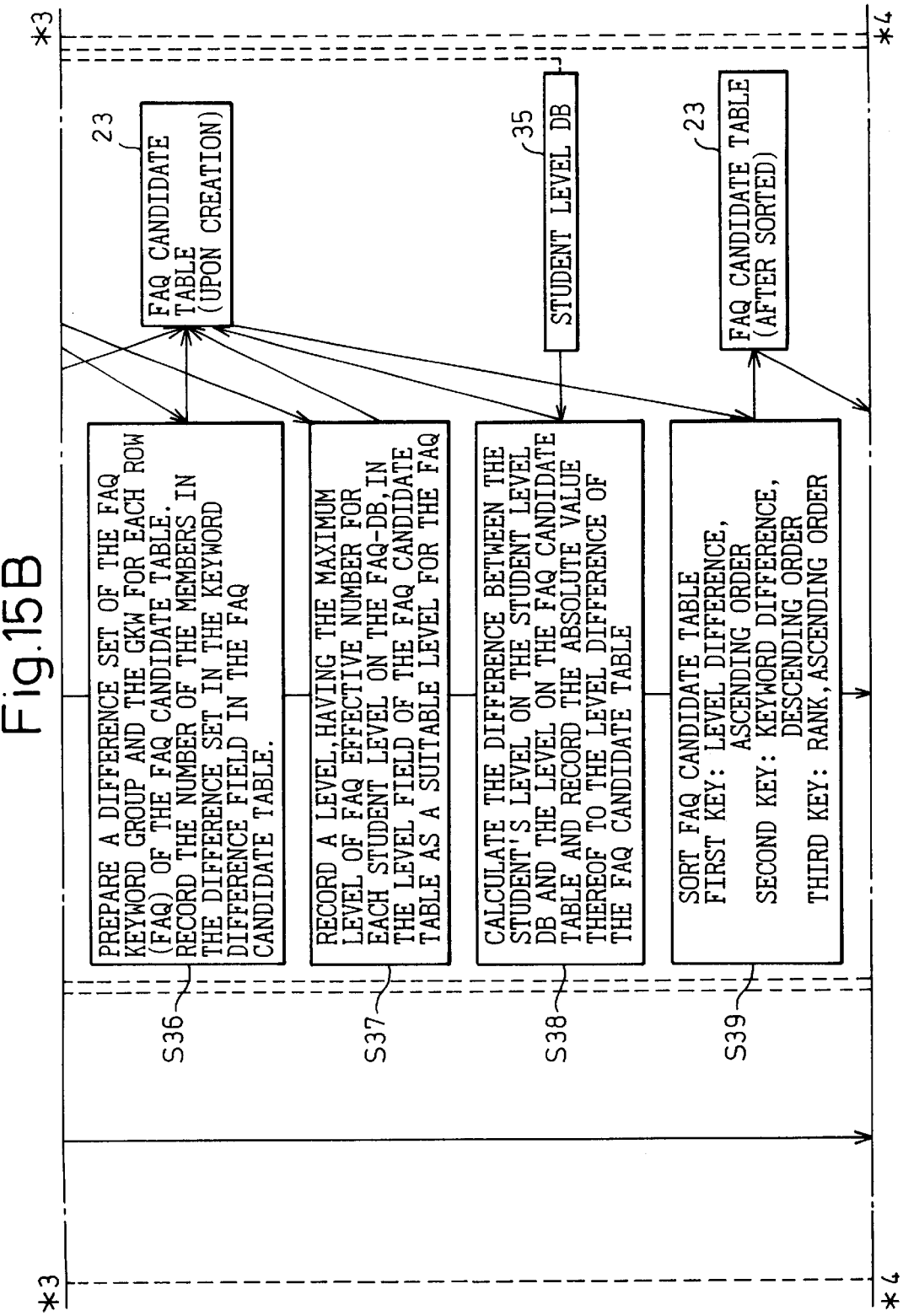

FIGS. 15A, 15B and 15C integrally show a process of preparing a question selecting screen and answering the FAQ in the step S19 of FIG. 9C.

Upon receiving a request for a FAQ search from a student (S31), the student controlling section 21 obtains the current educational-material unit number i (S32) from the current educational-material unit table 22 (FIG. 13), and then, reads a level of the student from the student level DB 35 (FIG. 11) (S33).

From the "learned keyword" obtained from the student's level DB 35, a keyword whose latest access time exceeds a predetermined period was excluded to prepare a group GKW (S34). By this process, a keyword, which seems to be forgotten by the student because a very long time has already passed since the keyword was obtained, is excluded from the group GKW.

Next, from the educational-material unit/FAQ relation table 33 (FIG. 8), a row showing the currently learned educational-material unit number is read and transcribed to the FAQ candidate table 23.

FIG. 16 shows a data layout of the FAQ candidate table 23.

In the direction from the top to the bottom in the drawing, FAQ numbers are listed in accordance with the ranks in the educational-material unit/FAQ relation table 23.

The ranks of the FAQ numbers (corresponding to the column number) in the educational-material unit/FAQ relation table 33 (FIG. 8) are recorded in the rank field in the FAQ candidate table 23 (S35).

The FAQ keywords are read from the FAQ-DB 32 (FIG. 5) for each row (FAQ) of the FAQ candidate table 23. A difference set of the FAQ keyword and the GKW prepared in the step S34 is prepared. The number of the member in the different set is recorded in "keyword difference" of the table 23 (S36).

The larger value in the "keyword difference" means that a larger number of keywords in the learned keywords of the student do not match the FAQ keyword. Namely, it means that the FAQ includes many things that the student does not know. It can be said that if the value is larger, the FAQ is more suitable to the student.

Referring to the FAQ-DB 32 (FIG. 5), a level having the highest level value in the "Accumulation of FAQ effective number for each student level" of the FAQ is recorded in the "level" of the FAQ candidate table 23, as level suitable for the FAQ.

The difference D between the student level on the student level DB 35 (FIG. 5) and the FAQ level on the FAQ candidate table 23 (FIG. 16) is taken. The absolute value of the difference D is recorded in the "level difference" of the FAQ candidate table 23.

FIG. 17 shows an example of calculating the level difference.

The FAQ candidate table 23 (FIG. 16) is sorted (S39).

The sort keys includes the first key "level difference" (ascending order), the second key "keyword difference" (descending order) and the third key "rank" (ascending order).

FIG. 18 shows a situation after the table in FIG. 16 is sorted. The content after the sort is recorded in the FAQ candidate table 23.

As is explained above, in the FAQ candidate table 23 in FIG. 12, the FAQ are listed in the order from the FAQ having the smallest level difference. Namely, a FAQ, in which the actual student's level and the assumed student's level at which the FAQ is assumed to be effective are close, is listed higher.

If the level differences are the same, the FAQ are listed in the order from the FAQ having the largest keyword difference. Namely, a FAQ containing more keywords that the student has not obtained is listed higher.

If the keyword differences are the same, the FAQ are listed in the order from a FAQ having the highest rank. Namely, a FAQ having more matches in keyword to the currently learned educational-material unit is listed higher.

The questions of FAQ retrieved from the FAQ-DB 32 (FIG. 5) are sorted in the order recorded in the sorted FAQ candidate table 23 (FIG. 18), and the FAQ question selecting screen is prepared and transmitted to the student (S40).

FIG. 19 shows the FAQ question selecting screen. There is displayed a guide to the student and subsequently, questions of the FAQ listed in the order. Further, "Create Question" button is displayed at the lower part of the screen.

If the student cannot find a desired question in the FAQ questions, the student clicks the "Create Question" button. This process is the same as that in the above mentioned FIG. 14.

If the student finds a suitable FAQ question on the screen, the student selects and clicks the number thereof. Because the FAQ questions are displayed in the order from the most suitable FAQ, corresponding to the level and the course taking history of the student, the student can quickly reach the desired FAQ question.

When the student controlling section 21 receives the FAQ question that the student selected (S41), the answer corresponding to the question is retrieved from the FAQ-DB 32 (FIG. 5) and transmitted to the student with the screen for displaying answers (S42).

FIG. 20 shows a FAQ answer screen.

In the FAQ answer screen, the question that the student selected and the answer corresponding to the question is displayed. Further, buttons of "Effective, Continue search", "Effective, End search", "Ineffective, Continue search" and "Ineffective, End search" are displayed at the lower part of the screen.

The students reviews the FAQ answer, judges whether the answer is effective to him/her or not, and inputs the result using the answer screen. If the FAQ answer is effective to the student, the "Effective, continue" button or the "Effective, End search" button should be pressed. If it is not effective, the "Ineffective, Continue search" button or the "Ineffective, End search" button should be pressed.

When the student controlling section 21 receives the pressing of the button from the student (S43), it judges whether it is the "Effective" button or not (S44). If it is the effective button, 1 is added to the appropriate level of the "Accumulation of FAQ effective number for each student level" in the FAQ-DB 32 (S45) and the process proceeds to the step S46.

If the pressed button is the ineffective button (the step S44 is No), the process proceeds to the step S46.

Because the FAQ effective number is added for each student level, in the step S45, the student's level suitable for the FAQ may be changed, which is reflected to the above mentioned step S37, namely, the process for providing consistency between the student's level and the FAQ level.

In the step S46, it is judged whether the button is the "End search" button or not. If it is the complete search button, the process ends, but if it is not, the process returns to the step S40 and transmits the FAQ question again to the student.

According to the example explained above, FAQ questions are presented the student controlling section 21 in the order from the question that is thought to be most suitable for the student, at the time of the FAQ search from the student. The student selects the question that is most compatible to his/her own question from the presented questions.

This saves the student from inputting the question. Further, because the FAQ questions are displayed in the order suitable for the course-taking history and the level of the student, it becomes easy for the student to select a question.

Also, because the FAQ level is updated based on the level of the student who judged the FAQ as effective, compatibility to the student level becomes higher as the number of students increases.

According to the present invention, in a method for presenting questions by a host computer which receives questions from users, the most suitable question for the user can be presented.

What is claimed is:

1. A method for presenting a most suitable question by a host computer receiving a question from a user, wherein the host computer comprises:
   a receiving step for receiving a question search request information from a student's terminal,
   a retrieving step for retrieving a question, which matches to a keyword contained in the question search request information, from a question storing means for storing plurality of questions,
   a sorting step for sorting the questions retrieved at the retrieving step in accordance with a student's level of the student specified by the question search request information, and
   a transmitting step for transmitting the questions sorted in the sorting step to the student's terminal.

2. A method for presenting a most suitable question according to claim 1, wherein the question storing means stores each question with a referrer's level of the question, and
   the sorting step sorts the questions retrieved in the retrieving step in the order from the question whose referrer's level is the same level as the student's level of the student specified in the question search request information.

3. A program product for presenting a most suitable question, wherein it operates the steps, using a computer, comprising:
   a receiving step for receiving a question search request information from a student's terminal,
   a retrieving step for retrieving a question, which matches to a keyword contained in the question search request information, from a question storing means for storing a plurality of questions,
   a sorting step for sorting the questions retrieved at the retrieving step in accordance with a student's level of the student specified by the question search request information, and
   a transmitting step for transmitting the questions sorted in the sorting step to the student's terminal.

4. A computer-readable recording medium which records therein a program for presenting a most suitable question by which a computer operates the steps comprising:
   a receiving step for receiving a question search request information from a student's terminal,
   a retrieving step for retrieving a question, which matches to a keyword contained in the question search request information, from a question storing means for storing plurality of questions,
   a sorting step for sorting the questions retrieved at the retrieving step in accordance with a student's level of the student specified by the question search request information, and
   a transmitting step for transmitting the questions sorted in the sorting step to the student's terminal.

5. An apparatus for presenting a most suitable question comprising:
   a receiving means for receiving a question search request information from a student's terminal,
   a retrieving means for retrieving a question, which matches to a keyword contained in the question search request information, from a question storing means for storing plurality of questions,
   a sorting means for sorting the questions retrieved by the retrieving means in accordance with a student's level of the student specified by the question search request information, and
   a transmitting means for transmitting the questions sorted by the sorting means to the student's terminal.

* * * * *